United States Patent
Wang et al.

(10) Patent No.: US 11,891,728 B2
(45) Date of Patent: Feb. 6, 2024

(54) SIC/ZRC COMPOSITE FIBER, PREPARATION METHOD AND USE THEREOF

(71) Applicant: SOUTHERN UNIVERSITY OF SCIENCE AND TECHNOLOGY, Shenzhen (CN)

(72) Inventors: Xiaofei Wang, Shenzhen (CN); Mingyu Zhu, Shenzhen (CN); Yulei Li, Shenzhen (CN); Fuzeng Ren, Shenzhen (CN); Yusheng Zhao, Shenzhen (CN)

(73) Assignee: Southern University of Science and Technology, Shenzhen (CN)

( * ) Notice: Subject to any disclaimer, the term of this patent is extended or adjusted under 35 U.S.C. 154(b) by 705 days.

(21) Appl. No.: 16/939,684

(22) Filed: Jul. 27, 2020

(65) Prior Publication Data
US 2021/0198815 A1    Jul. 1, 2021

(30) Foreign Application Priority Data
Dec. 25, 2019  (CN) .......................... 201911355624.4

(51) Int. Cl.
*C04B 35/622* (2006.01)
*D01F 8/18* (2006.01)
(Continued)

(52) U.S. Cl.
CPC ............ *D01F 8/18* (2013.01); *C04B 35/5622* (2013.01); *C04B 35/571* (2013.01);
(Continued)

(58) Field of Classification Search
CPC .................. C04B 35/571; C04B 35/62277
See application file for complete search history.

(56) References Cited

U.S. PATENT DOCUMENTS

| | | | | |
|---|---|---|---|---|
| 4,283,376 A | * | 8/1981 | Yajima | C08G 77/32 |
| | | | | 264/433 |
| 4,347,347 A | * | 8/1982 | Yajima | C01B 32/907 |
| | | | | 528/33 |

(Continued)

FOREIGN PATENT DOCUMENTS

| | | |
|---|---|---|
| CN | 101006211 A | 7/2007 |
| CN | 101876094 A | 11/2010 |

(Continued)

OTHER PUBLICATIONS

Ye et al. Fabrication and characterization of SiC/ZrC/C ultra-thin composite fibers, Elsevier, 2015, Material Letters 141, pp. 210-213 (Year: 2015).*

(Continued)

*Primary Examiner* — Andrew D Graham
(74) *Attorney, Agent, or Firm* — KDW Firm PLLC

(57) ABSTRACT

Provided are a SiC/ZrC composite fiber, a preparation method and use thereof. The SiC/ZrC composite fiber has a diameter of 10 to 70 μm. The method includes mixing liquid polycarbosilane with a zirconium-containing polymer to obtain a hybrid spinning solution, and then performing electrospinning to obtain a SiC/ZrC composite fiber precursor, crosslinking and thermally treating the SiC/ZrC composite fiber precursor in a protective atmosphere to obtain the SiC/ZrC composite fiber. The SiC/ZrC composite fiber is continuous and uniform, has an adjustable diameter, and thus has outstanding tensile strength and breaking strength and excellent high-temperature resistance. Without use of any organic solvent or spinning agent, the method achieves short process flow and high yield, indicating wide application prospects.

16 Claims, 2 Drawing Sheets

(51) Int. Cl.
*C04B 35/56* (2006.01)
*C04B 35/571* (2006.01)
*D01D 5/00* (2006.01)
*D01F 1/10* (2006.01)
*D01F 9/08* (2006.01)

(52) U.S. Cl.
CPC ....... *C04B 35/62277* (2013.01); *D01D 5/003* (2013.01); *D01F 1/10* (2013.01); *D01F 9/08* (2013.01); *C04B 2235/483* (2013.01); *C04B 2235/5244* (2013.01); *C04B 2235/5264* (2013.01)

(56) References Cited

U.S. PATENT DOCUMENTS

| | | | | | |
|---|---|---|---|---|---|
| 4,515,742 | A | * | 5/1985 | Yajima | C04B 35/571 264/211.14 |
| 4,556,526 | A | * | 12/1985 | Yajima | C08G 77/398 501/91 |
| 4,657,991 | A | * | 4/1987 | Takamizawa | C08L 83/16 528/33 |
| 4,916,093 | A | * | 4/1990 | Okamura | D01F 9/10 264/433 |
| 5,167,881 | A | * | 12/1992 | Atwell | C04B 35/571 264/211.17 |
| 5,354,527 | A | * | 10/1994 | Frechette | C04B 35/571 264/657 |
| 5,366,943 | A | * | 11/1994 | Lipowitz | C04B 35/571 501/88 |
| 6,582,650 | B1 | * | 6/2003 | Kumagawa | C08K 3/22 524/588 |
| 6,881,693 | B2 | * | 4/2005 | Yamaoka | D01F 9/08 502/178 |
| 2007/0093587 | A1 | * | 4/2007 | Shen | F16D 69/023 524/404 |
| 2015/0175750 | A1 | * | 6/2015 | Hopkins | C08L 83/00 524/588 |

FOREIGN PATENT DOCUMENTS

| | | |
|---|---|---|
| CN | 102503425 A | 6/2012 |
| CN | 104478436 A | 2/2017 |
| CN | 10980920 A | 5/2019 |

OTHER PUBLICATIONS

L. Ye et al, "Fabrication and Characterization of Sic/ZrC/C ultra-thin composite fibers," Laboratory of Advanced Polymer Materials, Institute of Chemistry, Chinese Academy of Sciences, Elsevier Journal, www.elsevier.com/locate/matlet Nov. 2015, pp. 210-213.
Chinese Office Action for Application No. 201911355624 dated Dec. 3, 2021.

* cited by examiner

SIC/ZRC COMPOSITE FIBER, PREPARATION METHOD AND USE THEREOF

CROSS-REFERENCE TO RELATED APPLICATION

This application claims priority to Chinese Patent Application No. 201911355624.4, filed on Dec. 25, 2019, the content of which is incorporated by reference herein in its entirety.

TECHNICAL FIELD

The present invention relates to the field of composite materials, and in particular, to a SiC/ZrC composite fiber, a preparation method and use thereof.

BACKGROUND

As one of ultrahigh temperature ceramic materials, zirconium carbide (ZrC) is considered as the most potential thermal protection material for a supersonic aircraft and also the most potential cladding material for a solar thermoelectric receiver and nuclear fuel due to its high hardness and high melting point, as well as good chemical stability and radiation resistance. However, ZrC materials are highly brittle, resulting in poor thermal shock resistance and proneness to damage during rapid heating, thereby causing catastrophic failure. Therefore, it is widely concerned to enhance a ZrC matrix and effectively overcome defects of the ZrC ceramic such as poor toughness and low reliability to obtain the ZrC ceramic material with high reliability, oxidation resistance and toughness.

At present, the most studied material is the SiC/ZrC composite ceramic material. The dominating preparation method of such a material consists of: dissolving solid SiC and ZrC ceramic precursors in an organic solvent to obtain a SiC/ZrC composite ceramic precursor, and then producing the SiC/ZrC composite material through high-temperature pyrolysis. CN102503425A relates to a inorganic nonmetallic multiphase ceramic, and discloses an approach for preparing a silicon carbide/zirconium carbide multiphase ceramic comprising: the mixture A is obtained by dissolving zirconocene dichloride in a solvent under protection of inert atmosphere and adding liquid hyperbranched polycarbosilane; under the protection of inert atmosphere, the mixture A is subjected to reduced pressure distillation to remove the solvent to obtain a mixture B; and the mixture B undergoes cracking reaction under the inert atmosphere to give the silicon carbide/zirconium carbide multiphase ceramic. The solvent used in this method is any one of dimethyl sulfoxide, dimethylformamide, trichloromethane, dichloromethane, tetrahydrofuran or n-hexane. The preparation process of this method is complex. The conversion of the ceramic is very low due to the addition of organic solvent, besides that, the organic solvent has a certain harmful effect on the human body and the environment. The dimension of the as-obtained silicon carbide/zirconium carbide multiphase ceramic is uncontrollable.

CN104478436A discloses a preparation method of lamellar silicon carbide/zirconium carbide ultrahigh-temperature ceramic. The preparation method comprises the following steps: a silicon carbide tape-casting sheet and a zirconium carbide tape-casting sheet is prepared by adopting a tape-casting method, and alternately stacked, then subjected glue discharge and vacuum sintering. According to the preparation method, the usage amounts of polymethyl methacrylate, polyethylene glycol, ethanol and n-octyl alcohol are limited, so that a prepared tape-casting sheet is smooth in surface and generates no bubble; the glue discharge, sintering temperature, temperature increase speed and sintering pressure are limited in regulation and control, so that the prepared lamellar ultrahigh-temperature ceramic has the advantages of clearness in interface, moderation in strength and good ceramic compactness and is enhanced in fracture toughness by changing a crack propagation path. However, this preparation method is complicated in process, requires strict conditions and has low yield. The strength of the silicon carbide/zirconium carbide ceramic is low, the breaking strength of the silicon carbide layer is inconsistent with that of the zirconium carbide layer, and the uniformity is poor, thereby causing low breaking resistance.

Based on the research in the related art, how to develop a strategy that has simple preparation process and high ceramic yield without use of any organic solvent, whilst simultaneously to obtain a SiC/ZrC composite that exhibits a unique combination of properties, such as being continuous and uniform, being controllable in dimension, large specific surface area, high tensile strength and high breaking strength, have become urgent problems that need to be solved.

SUMMARY

In view of the problem in the related art, the present invention is intended to provide a SiC/ZrC composite fiber, a preparation method and use thereof. The SiC/ZrC composite fiber is continuous and uniform and is adjustable in diameter, has a large specific surface area, and has outstanding tensile strength and breaking strength and excellent high-temperature resistance. Without use of any organic solvent, the method has simplicity and high ceramic yield, and thus has a high application value.

To achieve the object, the present invention adopts technical solutions described below.

In a first aspect, the present invention provides a SiC/ZrC composite fiber having a diameter of 10 to 70 μm.

In the present invention, the diameter of the SiC/ZrC composite fiber may be 10 μm, 15 μm, 20 μm, 30 μm, 40 μm, 50 μm, 60 μm, 65 μm or 70 μm.

The SiC/ZrC composite fiber provided by the present invention, where SiC is bonded with ZrC in the form of a composite structure, is continuous and uniform. With its diameter ranging from 10 μm to 70 μm, the SiC/ZrC composite fiber belongs to the micro material. In contrast to the powdered SiC/ZrC material, the fibrous SiC/ZrC material can be used as a matrix in fabrication of a fiber-reinforced high temperature ceramic composites.

Preferably, the diameter of the SiC/ZrC composite fiber is 12 to 40 μm, such as 12 μm, 15 μm, 20 μm, 25 μm, 30 μm, 35 μm or 40 μm.

In a second aspect, the present invention provides a preparation method of the SiC/ZrC composite fiber described in the first aspect. The method includes steps described below.

(1) Under protection of an inert atmosphere, liquid polycarbosilane is mixed with a zirconium-containing polymer to obtain a hybrid spinning solution, and electrospinning is performed to obtain a SiC/ZrC composite fiber precursor.

(2) The SiC/ZrC composite fiber precursor obtained in step (1) is crosslinked and thermally treated in a protective atmosphere to obtain the SiC/ZrC composite fiber.

In the preparation method of the SiC/ZrC composite fiber provided by the present invention, liquid polycarbosilane is used as a main raw material, a hybrid spinning solution is obtained by mixing the liquid polycarbosilane with the zirconium-containing polymer without addition of any organic solvent, a SiC/ZrC composite fiber precursor is prepared by using an electrospinning technology without any spinning agent, and then the SiC/ZrC composite fiber is obtained by crosslinking and thermally treatment. Through the method, the regulation and control of appearance and performance of the fiber can be achieved by varying the proportion of each precursor in the hybrid spinning solution and the spinning process, the phase structure and the element composition of the composite fiber is controlled by varying the thermal treatment conditions, and a reticular random or orientated composite fiber membrane is obtained by varying a collector device form of the electrospinning equipment. The method presents short process flow, mild conditions, high yield, easy industrialization, and thus wide application prospects.

Preferably, the zirconium-containing polymer in step (1) includes any one of or a combination of at least two of polyzirconoxane, zirconium acetylacetonate, or tetraallylamine zirconium. Representative but non-limiting examples of the combination are: a combination of polyzirconoxane and zirconium acetylacetonate, a combination of polyzirconoxane and tetraallylamine zirconium, and a combination of zirconium acetylacetonate and tetraallylamine zirconium.

In the present invention, the polyzirconoxane used herein has a weight average molecular weight of $M_w$=62000-67000, and a softening temperature of 140 to 180° C.

Preferably, a mass ratio of the liquid polycarbosilane to the zirconium-containing polymer in step (1) is (1-5):1, such as 1:1, 2:1, 2.5:1, 3:1, 3.5:1, 4:1, 4.5:1 or 5:1, and preferably (3-4.5):1. If the mass ratio is less than 1:1, the viscosity of the obtained hybrid spinning solution is too high, thus the syringe would be blocked and hence difficult to eject the spinning solution from the needle. If the mass ratio is greater than 5:1, the viscosity of the hybrid spinning solution is too small, making it necessary to add a polymer which is easy to spin (i.e., a spinning agent such as PS and/or PVP) for the electrospinning process.

Preferably, the mixing in step (1) is in a manner comprising glass rod stirring, magnetic stirring or mechanical stirring, preferably magnetic stirring.

In the present invention, the mixing refers to mixing thoroughly.

Preferably, the mixing in step (1) is for a period of 1 to 5 hours, such as 1 hour, 2 hours, 3 hours, 4 hours or 5 hours, and preferably 2 to 4 hours.

Preferably, the hybrid spinning solution in step (1) has a viscosity of 0.5 to Pa·s, such as 0.5 Pa·s, 1 Pa·s, 3 Pa·s, 5 Pa·s, 8 Pa·s or 10 Pa·s, and preferably 1 to 5 Pa·s. If the viscosity is less than 0.5 Pa·s, no jet flow can be formed, but only droplets are formed, which leads to the difficulty of fiber formation, making it necessary to add a spinning agent. If the viscosity is more than 10 Pa·s, the flowability of the hybrid spinning solution becomes poor, which make the injector easy to be clogged, and besides, the polymer molecular chain is liable to entangle and then causes the instability of the jet flow, which makes it difficult to produce fibers with uniform diameter distribution.

Preferably, the electrospinning in step (1) is carried out at a voltage of 10 to 30 kV, such as 10 kV, 15 kV, 20 kV, 25 kV or 30 kV, and preferably 15 to 25 kV. Preferably, an injection flow rate for the electrospinning in step (1) is 1 to 5 mL/h, such as 1 mL/h, 1.5 mL/h, 2 mL/h, 2.5 mL/h, 3 mL/h, 3.5 mL/h, 4 mL/h, 4.5 mL/h or 5 m L/h, and preferably 1.5 to 4 m L/h. If the injection flow rate is less than 1 mL/h, the spinning solution produced by the injection pump cannot satisfy the electric field force stretching amount, the formed Taylor cone is unstable, and the spinning is not continuous, resulting in some fractured fibers on the receiving plate. If the injection flow rate is more than 5 mL/h, there is too much spinning solution at the needle, which will make droplets gather at the needle, thereby affecting the spinning process.

Preferably, a fiber collecting distance for the electrospinning in step (1) is 5 to 20 cm, such as 5 cm, 8 cm, 10 cm, 12 cm, 15 cm, 18 cm or 20 cm, and preferably 8 to 18 cm. If the fiber collecting distance is less than 5 cm, there is less chance of jet stretching and whipping, which reduces the spinning area. If the fiber collecting distance is greater than 20 cm, the accelerated speed is reduced due to the small electric field force, so that as-spun fibers ejected from the needle will be not easy to fall onto the receiving plate.

Preferably, the electrospinning in step (1) is for a period of 1 to 10 hours, such as 1 hour, 3 hours, 5 hours, 8 hours or 10 hours, and preferably 3 to 8 hours. If the period is shorter than 1 hour, the jet stretching time is shortened and the fiber with uniform diameter distribution is not easy to be produced. If the period is longer than 10 hours, the solvent in the spinning solution will be completely evaporated, so that continuous spinning cannot be carried out.

Preferably, the protective atmosphere in step (2) includes any one of or a combination of at least two of hydrogen, nitrogen, argon or helium. Representative but non-limiting examples of the combination are: a combination of hydrogen and nitrogen, a combination of hydrogen and argon, and a combination of nitrogen and helium.

Preferably, a heating rate for the crosslinking in step (2) is 1 to 5° C./min, such as 1° C./min, 1.5° C./min, 2° C./min, 3° C./min, 4° C./min, 4.5° C./min or 5° C./min.

Preferably, a temperature for the crosslinking in step (2) is 100 to 180° C., such as 100° C., 120° C., 140° C., 160° C. or 180° C., and preferably 120 to 160° C.

Preferably, the crosslinking in step (2) is for a period of 1 to 5 hours, such as 1 hour, 2 hours, 3 hours, 4 hours or 5 hours, and preferably 2 to 4 hours.

Preferably, a temperature for the thermal treatment in step (2) is 1300 to 1800° C., such as 1300° C., 1350° C., 1400° C., 1500° C., 1600° C., 1700° C., 1750° C., or 1800° C., and preferably 1400 to 1700° C. If the temperature is below 1300° C., the phase structure of SiC/ZrC in the composite fiber cannot be sufficiently crystallized. If the temperature is higher than 1800° C., the crystallization rate of SiC/ZrC in the composite fiber increases and the grain size increases, which will cause the fiber fracture.

Preferably, a heating rate for the thermal treatment in step (2) is 1 to 15° C./min, such as 1° C./min, 2° C./min, 5° C./min, 8° C./min, 10° C./min, 12° C./min or ° C./min, and preferably 5 to 10° C./min.

Preferably, the thermal treatment in step (2) is for a period of 1 to 5 hours, such as 1 hour, 2 hours, 3 hours, 4 hours or 5 hours, and preferably 2 to 4 hours.

In the present invention, the protective gas used for the crosslinking and thermal treatment may be the same protective gas, or may be different protective gas, as long as the protective gas has a protective effect.

As a preferred technical solution of the present invention, the method includes steps described below.
(1) A hybrid spinning solution of liquid polycarbosilane and a zirconium-containing polymer in a mass ratio of (1-5):1 at 18 to 25° C. is prepared, and the solution is magnetically stirred for 1 to 5 hours to obtain a hybrid spinning solution with a viscosity of 0.5 to 10 Pa·s.
(2) The hybrid spinning solution obtained in step (1) is charged into a glass injector before electrospinning for 1 to 10 hours under conditions including an output voltage of 10 to 30 kV, an injection flow of 1 to 5 mL/h and a fiber collecting distance on a flat aluminum foil of 5 to 20 cm, so as to obtain a SiC/ZrC composite fiber precursor.
(3) The SiC/ZrC composite fiber precursor obtained in step (2) is heated to 100 to 180° C. at a certain rate in a protective atmosphere for crosslinking for 1 to 5 hours, and finally heated to 1300 to 1800° C. at a certain rate in the protective atmosphere for high-temperature thermal treatment for 1 to hours to obtain the SiC/ZrC composite fiber.

In a third aspect, the present invention further provides the use of the SiC/ZrC composite fiber described in the first aspect in an aircraft, a solar thermoelectric receiver and a nuclear fuel cladding.

Compared with the related art, the present invention has the following beneficial effects:
(1) The SiC/ZrC composite fiber provided by the present invention is continuous and uniform and is adjustable in diameter, has a tensile strength and breaking strength up to 1200 MPa and 900 MPa respectively, and is resistant to 1100° C. indicating excellent tensile strength and breaking strength and great high-temperature resistance.
(2) Without addition of any organic solvent or spinning agent, the preparation method of the SiC/ZrC composite fiber provided by the present invention has the advantages of short preparation process flow, mild conditions, a ceramic conversion rate of more than 62%, and easy industrialization. Therefore, the method has a high application value.

DETAILED DESCRIPTION

The technical solutions of the present invention will be further described below through specific embodiments in conjunction with the drawings. Embodiments set forth below are merely simple examples of the present invention, and are not intended to represent or limit the protection scope of the present invention. The protection scope of the present invention is defined by the claims.

Example 1

This example provides a preparation method of a SiC/ZrC composite fiber. The method includes the following steps.
(1) A hybrid spinning solution of liquid polycarbosilane and polyzirconoxane in a mass ratio of 3:1 was prepared at 18° C., and then fully magnetically stirred for 3 hours to obtain the hybrid spinning solution with the viscosity of 4.8 Pa·s.
(2) The hybrid spinning solution obtained in step (1) was charged into a glass syringe before electrospinning for 6 hours under the conditions that the output voltage was 15 kV, the injection flow was 2.5 mL/h and the fiber collecting distance on a flat aluminum foil was 10 cm to obtain a SiC/ZrC composite fiber precursor.
(3) The SiC/ZrC composite fiber precursor obtained in step (2) was heated to 120° C. at a rate of 2° C./min in an argon atmosphere for crosslinking for 3 hours, and finally heated to 1600° C. at a rate of 5° C./min under the protection of argon for high-temperature thermal treatment for 2 hours to obtain the SiC/ZrC composite fiber.

The diameter of the SiC/ZrC composite fiber prepared in this example was 12 μm, and its yield was 78%.

Figure 1:
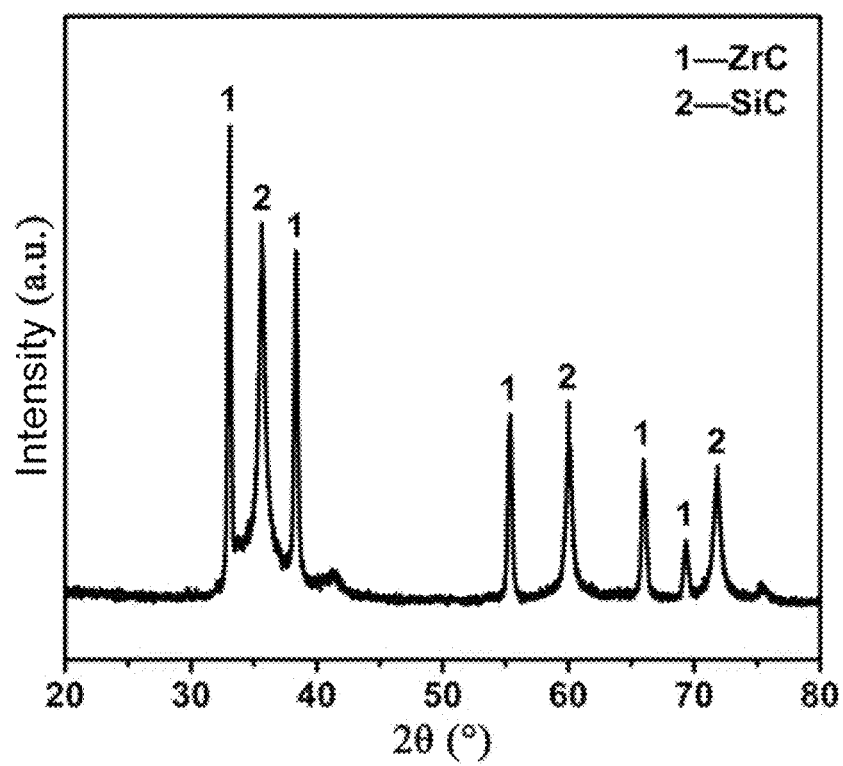
FIG. 1 is an XRD diagram of a SiC/ZrC composite fiber prepared in Example 1.

The SiC/ZrC composite fiber prepared in this example was characterized by X-ray Diffraction (XRD), and the characterization results are shown in FIG. 1. The figure shows the characteristic diffraction peaks of SiC and ZrC. There is almost no impurity phase. It is indicated that the SiC/ZrC composite fiber prepared in this example has great crystallinity and high purity.

Figure 2:
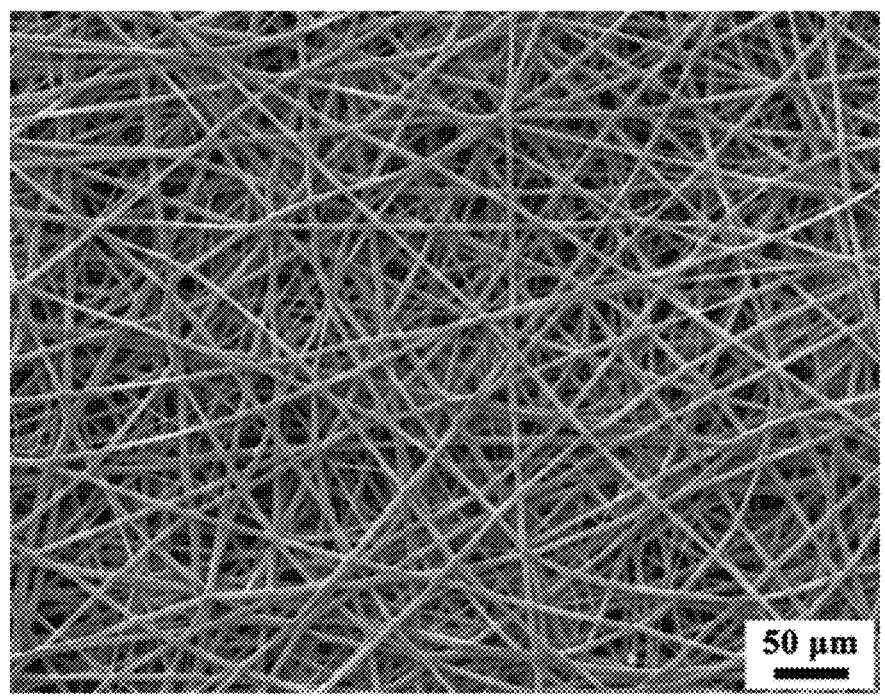
FIG. 2 is an SEM diagram of the SiC/ZrC composite fiber prepared in Example 1.

The SiC/ZrC composite fiber prepared in this example was characterized by scanning electron microscopy (SEM), and the characterization results are shown in FIG. 2. As can be seen from the figure, the SiC/ZrC composite fiber is uniform and continuous.

Figure 3:
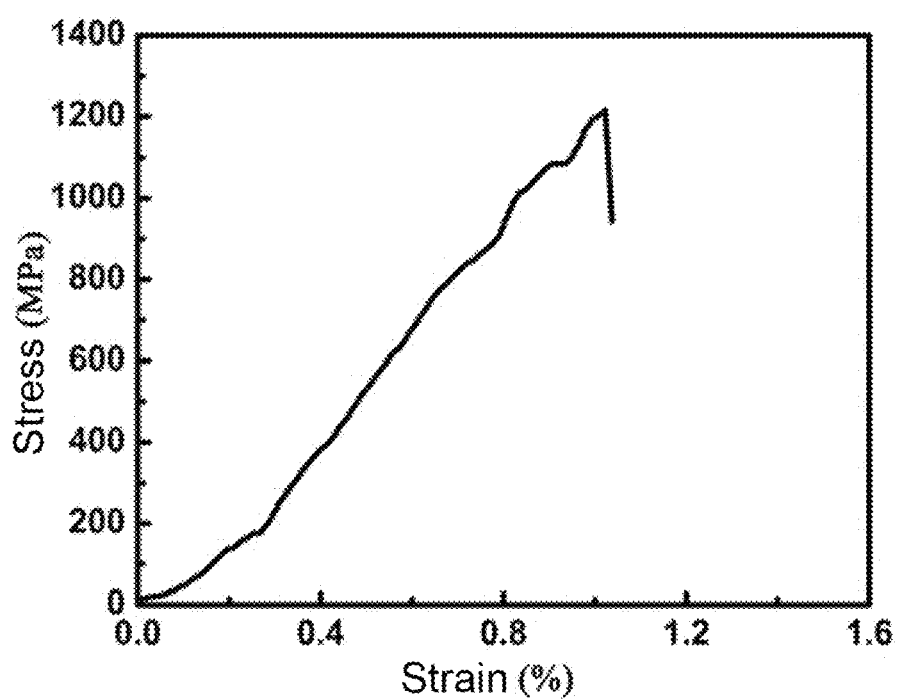
FIG. 3 is a stress-strain curve of the SiC/ZrC composite fiber prepared in Example 1.

The SiC/ZrC composite fiber prepared in this example was subjected to tensile strength testing. The test method was as follows: the strength of the composite fiber was tested by adopting a Shanghai JSF08 high-precision micro tester for mechanical properties of short fibers, where the gauge length was and the elongation rate was 0.5 mm/min. The test results are shown in FIG. 3. As can be seen from the figure, the tensile strength increased with increasing strain. When the strain reached 1%, the tensile strength of the composite fiber was 1200 MPa, and when the strain continued to increase, the tensile strength of the composite fiber tends to be remarkably reduced until fracture.

Example 2

This example provides a preparation method of a SiC/ZrC composite fiber. The method includes the following steps.
(1) A hybrid spinning solution of liquid polycarbosilane and zirconium acetylacetonate in a mass ratio of 3.5:1 was prepared at the temperature of 20° C., and then fully magnetically stirred for 4 hours to obtain the hybrid spinning solution with the viscosity of 3.4 Pa·s.
(2) The hybrid spinning solution obtained in step (1) was charged into a glass syringe, before electrospinning for 5 hours under the conditions that the output voltage was 15 kV, the injection flow was 2 mL/h and the fiber collecting distance on a flat aluminum foil was 15 cm to obtain a SiC/ZrC composite fiber precursor.
(3) The SiC/ZrC composite fiber precursor obtained in step (2) was heated to 140° C. at a rate of 2° C./min in an argon atmosphere for crosslinking for 2 hours, and finally heated to 1550° C. at a rate of 5° C./min under the protection of argon for high-temperature thermal treatment for 2 hours to obtain the SiC/ZrC composite fiber.

The diameter of the SiC/ZrC composite fiber prepared in this example was 18 μm, and its yield was 73%.

Example 3

This example provides a preparation method of a SiC/ZrC composite fiber. The method includes the following steps.
(1) A hybrid spinning solution of liquid polycarbosilane and polyzirconoxane in a mass ratio of 4:1 was prepared at the temperature of 22° C., and then fully magnetically stirred for 2 hours to obtain the hybrid spinning solution with the viscosity of 2.1 Pa·s.
(2) The hybrid spinning solution obtained in step (1) was charged into a glass syringe before electrospinning for 5 hours under the conditions that the output voltage was 15 kV, the injection flow was 1.5 mL/h and the fiber collecting distance on a flat aluminum foil was 10 cm to obtain a SiC/ZrC composite fiber precursor.
(3) The SiC/ZrC composite fiber precursor obtained in step (2) was heated to 120° C. at a rate of 5° C./min in an argon atmosphere for crosslinking for 3 hours, and finally heated to 1500° C. at a rate of 8° C./min under the protection of argon for high-temperature thermal treatment for 3 hours to obtain the SiC/ZrC composite fiber.

The diameter of the SiC/ZrC composite fiber prepared in this example was 30 μm, and its yield was 68%.

Example 4

This example provides a preparation method of a SiC/ZrC composite fiber. The method includes the following steps.
(1) A hybrid spinning solution of liquid polycarbosilane and polyzirconoxane in a mass ratio of 4.5:1 was prepared at the temperature of 25° C., and then fully magnetically stirred for 4 hours to obtain the hybrid spinning solution with the viscosity of 1.3 Pa·s.
(2) The hybrid spinning solution obtained in step (1) was charged into a glass syringe before electrospinning for 4 hours under the conditions that the output voltage was 15 kV, the injection flow was 2.5 mL/h and the fiber collecting distance on a flat aluminum foil was 15 cm to obtain a SiC/ZrC composite fiber precursor.
(3) The SiC/ZrC composite fiber precursor obtained in step (2) was heated to 140° C. at a rate of 2° C./min in an argon atmosphere for crosslinking for 4 hours, and finally heated to 1600° C. at a rate of 5° C./min under the protection of argon for high-temperature thermal treatment for 2 hours to obtain the SiC/ZrC composite fiber.

The diameter of the SiC/ZrC composite fiber prepared in this example was 25 μm, and its yield was 72%.

Example 5

This example provides a preparation method of a SiC/ZrC composite fiber. The method includes the following steps.
(1) A hybrid spinning solution of liquid polycarbosilane with polyzirconoxane and zirconium acetylacetonate in a mass ratio of 1:1 was prepared at the temperature of 20° C., where the mass ratio of polyzirconoxane to zirconium acetylacetonate was controlled to be 1:1, and then fully magnetically stirred for 1 hour to obtain the hybrid spinning solution with the viscosity of 10 Pa·s.
(2) The hybrid spinning solution obtained in step (1) was charged into a glass syringe before electrospinning for 1 hour under the conditions that the output voltage was 10 kV, the injection flow was 1 mL/h and the fiber collecting distance on a flat aluminum foil was 5 cm to obtain a SiC/ZrC composite fiber precursor.
(3) The SiC/ZrC composite fiber precursor obtained in step (2) was heated to 100° C. at a rate of 5° C./min in a hydrogen atmosphere for crosslinking for 1 hour, and finally heated to 1800° C. at a rate of 8° C./min under the protection of hydrogen for high-temperature thermal treatment for 1 hour to obtain the SiC/ZrC composite fiber.

The diameter of the SiC/ZrC composite fiber prepared in this example was 68 μm, and its yield was 62%.

Example 6

This example provides a preparation method of a SiC/ZrC composite fiber. The method includes the following steps.
(1) A hybrid spinning solution of liquid polycarbosilane and tetraallylamine zirconium in a mass ratio of 5:1 was prepared at the temperature of 25° C., and then fully magnetically stirred for 5 hours to obtain the hybrid spinning solution with the viscosity of 0.5 Pa·s.
(2) The hybrid spinning solution obtained in step (1) was charged into a glass syringe before electrospinning for 10 hours under the conditions that the output voltage was 30 kV, the injection flow was 5 mL/h and the fiber collecting distance on a flat aluminum foil was 20 cm to obtain a SiC/ZrC composite fiber precursor.
(3) The SiC/ZrC composite fiber precursor obtained in step (2) was heated to 180° C. at a rate of 2° C./min in a nitrogen atmosphere for crosslinking for 5 hours, and finally heated to 1300° C. at a rate of 5° C./min under the protection of nitrogen for high-temperature thermal treatment for 5 hours to obtain the SiC/ZrC composite fiber.

The diameter of the SiC/ZrC composite fiber prepared in this example was μm, and its yield was 65%.

Example 7

This example is only different from Example 1 in that the thermal treatment in step (3) was 1100° C.

The SiC/ZrC composite fiber prepared in this example contained a larger amount of amorphous phases. The diameter of the fiber was 55 μm, and its yield was 54%.

Example 8

This example is only different from Example 1 in that the thermal treatment in step (3) was 2000° C.

The SiC/ZrC composite fiber prepared in this example was not continuous and even fractured. The diameter of the fiber was 80 μm, and its yield was 67%.

Evaluation of SiC/ZrC Performances:

The SiC/ZrC composite fibers prepared in the above examples and the SiC/ZrC composite material prepared in Comparative Example 1 were subjected to testing in terms of tensile strength, breaking strength and high temperature resistance. The test method was as follows: the strength of the composite fiber was tested by adopting a Shanghai JSF08 high-precision micro tester for mechanical properties of short fibers, where the gauge length was 10 mm and the elongation rate was 0.5 mm/min.

The tensile strength and breaking strength were tested as described in Example 1.

The high temperature resistance was tested by using a NETZSCH STA 449C thermal analyzer. The test atmosphere was air, and the heating rate was 5° C./min.

The test results are shown in Table 1.

TABLE 1

|  | Diameter (μm) | Tensile Strength (MPa) | Breaking Strength (MPa) | Temperature Tolerance (° C.) |
| --- | --- | --- | --- | --- |
| Example 1 | 12 | 1200 | 900 | 1100 |
| Example 2 | 18 | 1100 | 740 | 1100 |
| Example 3 | 30 | 880 | 650 | 1000 |
| Example 4 | 25 | 1000 | 830 | 1050 |
| Example 5 | 68 | 640 | 500 | 920 |
| Example 6 | 40 | 760 | 530 | 1000 |
| Example 7 | 55 | 720 | 515 | 950 |
| Example 8 | 80 | 480 | 290 | 900 |

The following points can be seen from Table 1.

(1) It can be seen from Examples 1 to 8 that for the SiC/ZrC composite fiber obtained in the Examples 1 to 8 by mixing the main raw material, i.e., liquid polycarbosilane, with the zirconium-containing polymer to obtain the hybrid spinning solution, spinning using the electrospinning technology and then performing crosslinking and high-temperature thermal treatment, the diameter was 12 to 80 μm, the tensile strength was 480 to 1200 MPa, the breaking strength was 290 to 900 MPa, and the temperature tolerance was 900 to 1100° C. It is indicated that the SiC/ZrC composite fibers prepared in Examples 1 to 8 possess a controllable diameter and excellent tensile strength, breaking strength and high-temperature resistance.

(2) It can be seen from Example 1 and examples 7 and 8 that the SiC/ZrC composite fiber obtained in Example 1 at a high-temperature thermal treatment temperature of 1600° C. were more uniform and continuous and have higher crystallinity of the two phases of SiC/ZrC than those of Examples 7 and 8 obtained at the thermal treatment temperature of 1100° C. and 2000° C. respectively, and that, in addition, the tensile strength was 1200 MPa, 720 MPa and 480 MPa respectively, the breaking strength was 900 MPa, 515 MPa and 290 MPa respectively, and the temperature resistance was 1100° C., 950° C. and 900° C. respectively. It is indicated that the tensile strength, breaking strength and high temperature resistance of the SiC/ZrC composite fiber prepared in Example 1 are better than those of the SiC/ZrC composite materials prepared in examples 7 and 8. It is further indicated that the temperature for high-temperature thermal treatment adopted in Example 1 is more favorable for obtaining the SiC/ZrC composite fiber with higher tensile strength, breaking strength and temperature resistance.

In conclusion, the SiC/ZrC composite fiber provided by the present invention is continuous and uniform, its diameter is adjustable, its highest tensile strength and breaking strength can reach 1200 MPa and 900 MPa respectively, and the composite fiber can be resistant to 1100° C. The composite fiber thus has excellent tensile strength, breaking strength and high temperature resistance. Without addition of any organic solvent or spinning agent, the preparation method of the SiC/ZrC composite fiber provided by the present invention has the advantages of short preparation process flow, mild conditions, a ceramic conversion rate of more than 62%, and easy industrialization. Therefore, the method has wide application prospects.

The applicant has stated that although the detailed structure characteristics of the present invention are described through the embodiments described above, the present invention is not limited to the detailed structure characteristics described above, which means that implementation of the present invention does not necessarily depend on the detailed structure characteristics described above. It should be apparent to those skilled in the art that any improvements made to the present invention, equivalent replacements of units selected in the present invention and addition of assistant units thereof, and selections of specific methods, etc., all fall within the protection scope and the disclosed scope of the present invention.

The invention claimed is:

1. A preparation method of a SiC/ZrC composite fiber having a diameter of 10 to 70 μm, comprising steps of:
   (1) under protection of an inert atmosphere, mixing liquid polycarbosilane with a zirconium-containing polymer to obtain a hybrid spinning solution, and performing electrospinning to obtain a SiC/ZrC composite fiber precursor; and
   (2) crosslinking and thermally treating the SiC/ZrC composite fiber precursor obtained in step (1) in a protective atmosphere to obtain the SiC/ZrC composite fiber;
   wherein the hybrid spinning solution in step (1) has a viscosity of from about 0.5 Pa·s to about 10 Pa·s;
   wherein an injection flow rate for the electrospinning in step (1) is from about 1 mL/h to about 5 mL/h;
   wherein a fiber collecting distance for the electrospinning in step (1) is from about cm to about 20 cm;
   wherein the electrospinning in step (1) is for a period of from about 1 hour to about hours;
   wherein a heating rate for the crosslinking in step (2) is from about 1° C./min to about 5° C./min;
   wherein a temperature for the crosslinking in step (2) is from about 100° C. to about 180° C.;
   wherein the crosslinking in step (2) is for a period of from about 1 hour to about 5 hours;
   wherein a temperature for the thermal treatment in step (2) is from about 1300° C. to about 1800° C.;
   wherein a heating rate for the thermal treatment in step (2) is from about 1° C./min to about 15° C./min; and
   wherein the thermal treatment in step (2) is for a period of from about 1 hour to about 5 hours.

2. The preparation method according to claim 1, wherein the zirconium containing polymer in step (1) comprises any one of or a combination of at least two of polyzirconoxane, zirconium acetylacetonate, or tetraallylamine zirconium.

3. The preparation method according to claim 1, wherein a mass ratio of the liquid polycarbosilane to the zirconium-containing polymer in step (1) is (1-5):1.

4. The preparation method according to claim 1, wherein the mixing in step (1) comprises glass rod stirring, magnetic stirring or mechanical stirring.

5. The preparation method according to claim 1, wherein the mixing in step (1) is for a period of 1 to 5 hours.

6. The preparation method according to claim 1, wherein the hybrid spinning solution in step (1) has a viscosity of 1 to 5 Pa·s.

7. The preparation method according to claim 1, wherein the electrospinning in step (1) is carried out at a voltage of 10 to 30 kV.

8. The preparation method according to claim 1, wherein an injection flow rate for the electrospinning in step (1) is 0.5 to 4 mL/h.

9. The preparation method according to claim 1, wherein a fiber collecting distance for the electrospinning in step (1) is 8 to 18 cm.

10. The preparation method according to claim 3, wherein the electrospinning in step (1) is for a period of 3 to 8 hours.

11. The preparation method according to claim 1, wherein a temperature for the crosslinking in step (2) is 120 to 160° C.

12. The preparation method according to claim 1, wherein the crosslinking in step (2) is for a period of 2 to 4 hours.

13. The preparation method according to claim 1, wherein a temperature for the thermal treatment in step (2) is 1400 to 1700° C.

14. The preparation method according to claim 1, wherein a heating rate for the thermal treatment in step (2) is 5 to 10° C./min.

15. The preparation method according to claim 1, wherein the thermal treatment in step (2) is for a period of 2 to 4 hours.

16. The preparation method according to claim 1, comprising steps of:

mixing the liquid polycarbosilane and the zirconium-containing polymer with a mass ratio of (1-5):1 at 18 to 25° C., and magnetically stirring the mixture for 1 to 5 hours to obtain the hybrid spinning solution with a viscosity of 0.5 to 10 Pa·s;

after charging the hybrid spinning solution into a glass injector, performing the electrospinning for 1 to 10 hours under conditions including an output voltage of 10 to 30 kV, an injection flow of 1 to 5 mL/h and a fiber collecting distance on a flat aluminum foil of 5 to 20 cm to obtain the SiC/ZrC composite fiber precursor; and heating the SiC/ZrC composite fiber precursor obtained in step W to 100 to 180° C. at a rate of 1 to 5° C./min in a protective atmosphere for crosslinking for 1 to 5 hours, and finally heating to 1300 to 1800° C. at a rate of 1 to 15° C./min in the protective atmosphere for the thermal treatment for 1 to 5 hours to obtain the SiC/ZrC composite fiber.

\* \* \* \* \*